(12) United States Patent
Sekino et al.

(10) Patent No.: US 10,696,250 B2
(45) Date of Patent: Jun. 30, 2020

(54) CURVATURE REGULATING MEMBER AND POWER SUPPLY DEVICE

(71) Applicant: Yazaki Corporation, Tokyo (JP)

(72) Inventors: Tsukasa Sekino, Shizuoka (JP); Mitsunobu Kato, Shizuoka (JP); Tatsuya Otsuka, Shizuoka (JP); Masaki Yokoyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 342 days.

(21) Appl. No.: 15/718,897

(22) Filed: Sep. 28, 2017

(65) Prior Publication Data
US 2018/0126927 A1    May 10, 2018

(30) Foreign Application Priority Data

Nov. 8, 2016 (JP) .................................. 2016-218002

(51) Int. Cl.
| | | |
|---|---|---|
| H02G 11/00 | (2006.01) | |
| B60R 16/027 | (2006.01) | |
| B60R 16/02 | (2006.01) | |
| H02G 3/04 | (2006.01) | |

(52) U.S. Cl.
CPC ........ *B60R 16/027* (2013.01); *B60R 16/0215* (2013.01); *H02G 3/0468* (2013.01); *H02G 3/0475* (2013.01); *H02G 11/006* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,473,769 A | * | 10/1969 | James | ..................... F16G 13/16 248/69 |
| 5,771,676 A | * | 6/1998 | Komiya | ............... H02G 11/006 59/78.1 |
| 5,836,148 A | * | 11/1998 | Fukao | ..................... F16G 13/16 59/78.1 |
| 6,354,070 B1 | * | 3/2002 | Blase | ..................... F16G 13/16 59/78.1 |
| 7,418,812 B2 | * | 9/2008 | Ikeda | ..................... F16G 13/16 248/49 |
| 9,701,262 B2 | | 7/2017 | Sekino et al. | |

(Continued)

FOREIGN PATENT DOCUMENTS

| | | |
|---|---|---|
| CN | 105359362 A | 2/2016 |
| CN | 105531892 A | 4/2016 |

(Continued)

*Primary Examiner* — Timothy J Thompson
*Assistant Examiner* — Krystal Robinson
(74) *Attorney, Agent, or Firm* — Kenealy Vaidya LLP

(57) ABSTRACT

A curvature regulating member and a power supply device to which the curvature regulating member is applied are provided. The curvature regulating member has a plurality of member pieces arranged along a wire harness, and a flexible connection. The curvature regulating member regulates a curvature of the wire harness on a predetermined plane by contact with the adjacent member pieces. A burr (strip projection) is provided in an inner surface of the receiving groove of the wire harness in at least one of the member pieces. Further, a recessed portion is provided in an area of the inner surface including the burr (strip projection).

8 Claims, 8 Drawing Sheets

(56) References Cited

U.S. PATENT DOCUMENTS

| | | | | |
|---|---|---|---|---|
| 9,732,888 | B2* | 8/2017 | Shiga | B60R 16/0215 |
| 9,797,473 | B2* | 10/2017 | Strack | H02G 11/006 |
| 9,841,079 | B2* | 12/2017 | Komiya | H02G 11/006 |
| 10,367,339 | B2* | 7/2019 | Galetti | F16L 3/015 |
| 10,377,327 | B1* | 8/2019 | Katoh | H02G 3/0462 |
| 2001/0025715 | A1* | 10/2001 | Muller | H02G 11/006 |
| | | | | 174/19 |
| 2005/0155338 | A1* | 7/2005 | Wehler | F16G 13/16 |
| | | | | 59/78.1 |
| 2006/0254800 | A1 | 11/2006 | Itou et al. | |
| 2007/0119610 | A1 | 5/2007 | Kisu et al. | |
| 2008/0264032 | A1* | 10/2008 | Kitagawa | F16G 13/16 |
| | | | | 59/78.1 |
| 2015/0203057 | A1* | 7/2015 | Terada | H02G 11/00 |
| | | | | 248/70 |
| 2016/0156165 | A1 | 6/2016 | Katou et al. | |
| 2017/0327060 | A1* | 11/2017 | Nakajima | B60R 16/0215 |
| 2019/0077343 | A1* | 3/2019 | Kogure | B60J 5/06 |

FOREIGN PATENT DOCUMENTS

| | | |
|---|---|---|
| JP | 2004-136735 A | 5/2004 |
| JP | 2006-347525 A | 12/2006 |
| JP | 2007-151257 A | 6/2007 |
| JP | 2008-67563 A | 3/2008 |
| JP | 2013-162716 A | 8/2013 |

\* cited by examiner

CURVATURE REGULATING MEMBER AND POWER SUPPLY DEVICE

The present invention relates to a curvature regulating member for regulating a curvature of a wire harness, and a power supply device to which the curvature regulating member is applied.

BACKGROUND OF THE INVENTION

Conventionally, in a vehicle having a slide member such as a slide door, a power supply device electrically connecting a vehicle body and the slide member through a wire harness is known (For example, see Patent Literatures 1 and 2). In such power supply device, the wire harness is held such that the wire harness is moved naturally following the slide member when moving the slide member.

Herein, as a construction holding the wire harness in the power supply device as described above, for example a construction arranged along a slide member and holding the wire harness swingably around a rocking shaft intersecting with the slide member in a moving direction is suggested (for example, see Patent Literatures 3 to 5). In the construction, when the slide member is moved, the wire harness is swung around the rocking shaft following the slide member.

Patent Literature 1: JP 2004-136735 A
Patent Literature 2: JP 2006-347525 A
Patent Literature 3: JP 2007-151257 A
Patent Literature 4: JP 2008-067563 A
Patent Literature 5: JP 2013-162716 A

SUMMARY OF THE INVENTION

In a power supply device having the above swinging structure, when the slide member is moved, the wire harness is curved and follows the slide member. Further, in a field of the above power supply device, a curvature regulating member which is arranged along a wire harness and regulates the curvature may be provided in some cases.

At this time, in the curvature regulating member, a strip projection is provided in a portion contacting with the wire harness. As one example of the strip projection, in the curvature regulating member metal-molded with resin material, there is a burr formed due to metal-molding. In the curvature regulating member having the strip projection, the strip projection may interfere with the wire harness in some cases. When the wire harness is curved following the slide member, the strip projection of the curvature regulating member rubs on the wire harness. For this reason, it is desirable that interference between the strip projection and the wire harness is suppressed as much as possible.

Thus, in view of the above request, an object of the present invention is to provide a curvature regulating member, which can suppress degree of the interference between the strip projection and the wire harness, and a power supply device to which the curvature regulating member is applied.

A curvature regulating member of the present invention includes a plurality of member pieces arranged along a wire harness and each having a receiving groove for accommodating the wire harness; and a flexible connection coupling the member pieces adjacent to each other. The curvature regulating member regulates a curvature of the wire harness on a predetermined plane by contact with the adjacent member pieces. A strip projection is provided in an inner surface of the receiving groove in at least one of the plurality of the member pieces, and a recessed portion is provided in an area including the strip projection in the inner surface.

Also, the strip projection described here includes an object accidentally formed such as a burr due to metal-molding or an object intentionally provided due to improvement of strength and design requirement.

Further, in the curvature regulating member of the present invention, the recessed portion is formed with a depth in which the strip projection is received.

Further, in the curvature regulating member of the present invention, each of the plurality of the member pieces has a pair of opposed walls opposed to each other so as to sandwich the wire harness between the opposed walls and a joining wall connecting one side to another side of the pair of the opposed walls, the recessed portion is formed by a pair of opposed surfaces opposed to each other in the pair of the opposed walls and a continuous surface continuing the opposed surfaces in the joining wall, and a recessed part formed in the pair of the opposed surfaces in the recessed portion has a tapered shape toward the joining wall in a plane view with respect to each of the pair of the opposed surfaces.

Furthermore, a power supply device of the present invention is provided in a vehicle having a vehicle body and a slide member, and electrically connects the vehicle body and the slide member. The power supply device has a wire harness arranged between the vehicle body and the slide member; and the curvature regulating member arranged along the wire harness and described above.

According to the curvature regulating member of the present invention, in the member piece having the strip projection in the inner surface of the receiving groove, the processed portion is provided in the area including the strip projection in the inner surface. Thereby, the strip projection stands from a bottom of the recessed portion, and interference with the wire harness accommodated in the receiving groove is suppressed by a depth of the recessed portion. In this way, according to the curvature regulating member of the present invention, a degree of the interference between the strip projection and the wire harness can be suppressed.

Further, according to the curvature regulating member of the present invention, the strip projection is received in the recessed portion. Therefore, the interference between the wire harness and the burr is avoided.

Further, according to the curvature regulating member of the present invention, in a case that the receiving groove of the member piece is formed by the inner mold having an outer shape corresponding to the inner shape thereof, the inner mold pulls out in a direction in which a projection part of the outer shape corresponding to the recessed part separate from a tip of the tapered shape. Thereby, mold release resistance when pulling out the inner mold is suppressed. Therefore, workability in manufacturing can be improved.

Furthermore, according to the curvature regulating member of the present invention, the above curvature regulating member is applied. Therefore, a degree of the interference the strip projection and the wire harness can be suppressed.

DESCRIPTION OF THE PREFERRED EMBODIMENT

Hereafter, a curvature regulating member and a power supply device according to one embodiment of the present invention will be explained.

Figure 1:
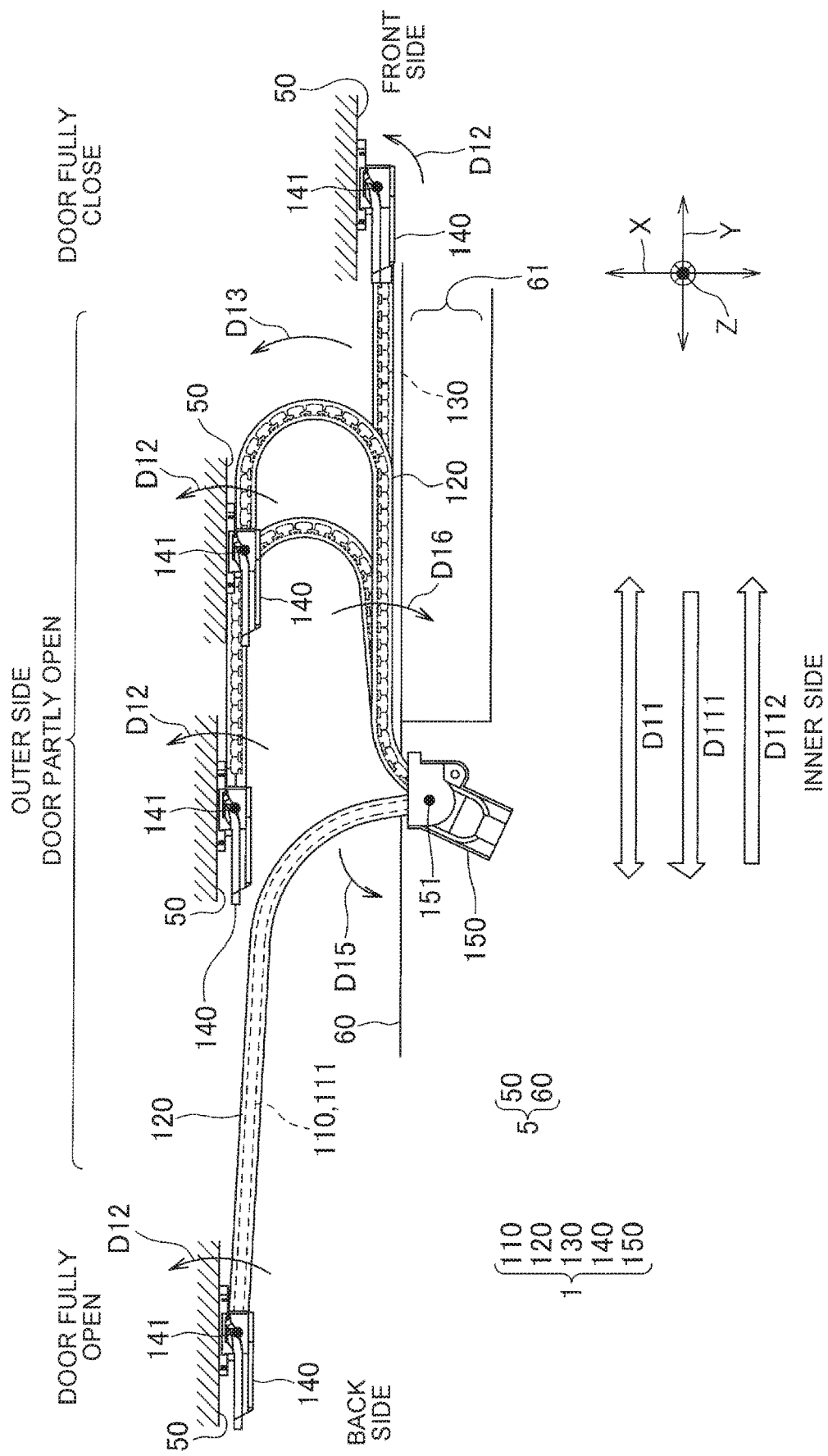
FIG. 1 is a view showing a power supply device in which a curvature regulating member according to one embodiment of the present invention is applied.

FIG. 1 is a diagram showing a power supply device to which a curvature regulating member according to the embodiment of the present invention is applied. The power supply device 1 of the embodiment in the present invention is a device for electrical connected in a vehicle 5 having a vehicle body 60 and a slide door 50 (slide member) through a wire harness 110 arranged between the vehicle body 60 and the slide door 50. Also, in FIG. 1, a right side in the drawing corresponds to a front side of the vehicle 5, a left side in the drawing corresponds to a back side of the vehicle 5, an upper side in the drawing corresponds to an outer side of the vehicle 5, and a lower side in the drawing corresponds to an inner side of the vehicle 5. Further, a X direction in the drawing is a horizontal direction of the vehicle 5, a Y direction is a front-back direction of the vehicle 5, and a Z direction is a vertical direction of the vehicle 5.

The power supply device 1 is a device for supplying power via a wire harness 110 from power source which is not shown and is located in the vehicle body side 60 to an electronic device which not shown and is located in the slide door 50. Further, in the power supply device 1, an electric signal is sent and received via the wire harness 110 between a control device which is not shown and arranged on the vehicle body 60 and the electric device which is not shown and arranged on the slide door 50. The power supply device 1 has the wire harness 110, a corrugated tube 120, a curvature regulating member 130, a door side holding member 140, and a vehicle body side holding member 150.

Figure 4:
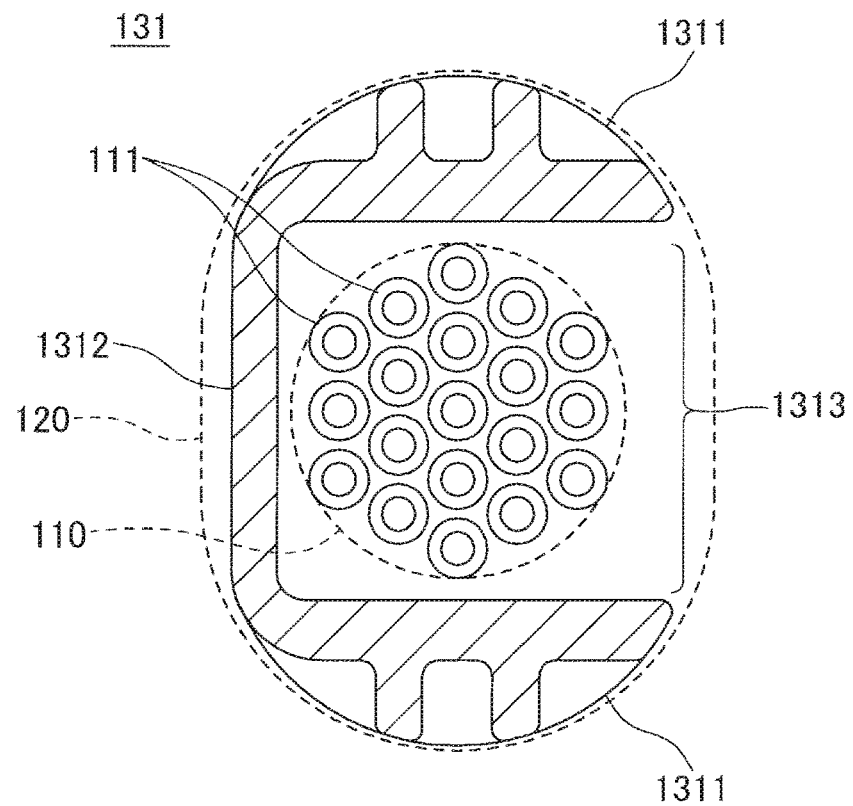
FIG. 4 is a cross-sectional view taken along the line V11-V11 in FIG. 3.

As shown in FIG. 4 to be referred to later, the wire harness 110 is configured by bundling a plurality of electric wires 111. A part of the wire harness 110 between the vehicle body 60 and the slide door 50 is inserted into the corrugated tube 120 which is a flexible tube made of resin. The curvature regulating member 130 is arranged along the wire harness 110 such that it is surrounded between an inner surface of the corrugated tube 120 and the wire harness 110 in a circumferential direction. The curvature regulating member 130 will be explained in detail later.

One end of the corrugated tube 120 at a slide door 50 side is swingably held to the door side holding portion 140 on the XY plane in a Z direction being a vertical direction of the vehicle 5 as a rocking shaft direction. The door side holding member 140 is fixed in the slide door 50. The door side rocking shaft 141 arranged in the door side holding portion 140 along the Z direction is an axis parallel to the slide door 50 and perpendicular to an opening and closing direction D11 of the slide door 50 (Y direction being the front-back direction). The one end of the corrugated tube 120 at the slide door 50 side is swingably held around the door side rocking shaft 141 by the door side holding portion 140. Since the corrugated tube 120 is held by the door side holding portion 140, a part of the wire harness 110 at the slide door 50 side is swingably held on the XY plane around the door side rocking shaft 141. The wire harness 110 at the slide door 50 side emerges from one end of the corrugated tube 120 at the slide door 50 side. Furthermore, the wire harness 110 emerges from the door side holding portion 140 through a passage of an inner portion of the door side holding portion 140 not shown, and then extends to the electric device of the slide door 50.

On the other hand, one end of the corrugated tube 120 at the vehicle body 60 side is swingably held in a vehicle body side holding portion 150 on the XY plane in the Z direction being the vertical direction of the vehicle 5 as a rocking shaft direction. The vehicle body side holding portion 150 is fixed in the vehicle body 60. The vehicle body side rocking shaft 151 arranged on the vehicle body side holding portion 150 along the Z direction is an axis parallel to the slide door 50 and perpendicular to the opening and closing direction D11 of the slide door 50. The one end of the corrugated tube 120 at the vehicle body 60 side is swingably held around the vehicle body side rocking shaft 151 by the vehicle body side holding portion 150. Since the corrugated tube 120 is held by the vehicle body side holding portion 150, a part of the wire harness 110 at the vehicle body 60 side is swingably held on the XY plane around the vehicle body side rocking shaft 151. The wire harness 110 at the vehicle body 60 side emerges from one end of the corrugated tube 120 at the vehicle body 60 side. Furthermore, the wire harness 110 emerges from the vehicle body side holding portion 150 through a passage of an inner portion of the vehicle body side holding portion 150 not shown, and then extends to a power source or control device not shown in the vehicle body 60.

As shown in FIG. 1, when the slide door 50 is fully closed, the door side holding portion 140 is located on a front side of the vehicle 5 against the vehicle body side holding portion 150. The corrugated tube 120, that is, the wire harness 110 of the inner side portion of the corrugated tube 120 linearly extends between the vehicle body side holding portion 150 and the door side holding portion 140.

When the slide door 50 is opened in an opening direction D11 toward the back of the vehicle 5, in its initial stage, the one end of the corrugated tube 120 at the slide door 50 side is swung as below. More specifically, the one end thereof separates from the slide door 50, and swings on the XY plane toward the front side of the vehicle 5 in an opposite side to the opening direction D111. In the door side holding portion 140, a coil spring is provided so as to prompt such swinging. The coil spring energizes the one end of the corrugated tube 120 at the slide door side in an energizing direction D12 so as to separate from the slide door 50 and to be oriented in an opposite direction to the opening direction D11 of the slide door 50.

Due to the above swinging at the initial stage of opening of the slide door 50, when subsequently moving the slide door 50 in the opening direction D111, that is, when the slide door 50 is partly opened, the wire harness 110 of the inner portion of the corrugated tube 120 is bent as below. More specifically, as shown in FIG. 1, the wire harness 110 is curved in an allowable direction D13 to be oriented in the outer side of the vehicle body 60 such that the wire harness 110 is drawn in a U-shaped on the XY plane with a projection in the front side of the vehicle 5 from the vehicle body side holding portion 150 toward the door side holding portion 140.

Also, hereinafter, without particular mention, the wire harness 110 of the inner portion of the corrugated tube 120 may be simply referred to as the wire harness 110.

In the curvature of the U-shaped as described above, a burden on the corrugated tube 120 and the wire harness 110 is reduced compared with a case that for example the wire harness 11 is curved in a S-shaped on the XY plane.

When the slide door 50 is moved in the opening direction D111, an arm in the U-shape of the wire harness 110 at the slide door 50 side linearly extends to the front side of the vehicle 5 by energizing it in the energizing direction D12 at the door side holding portion 140. In this case, the arm at the vehicle body 60 side linearly extends to the front side of the vehicle 5. Owing to the actions of each of those portions and the movement of the curvature regulating member 130 described below, the U-shape of the wire harness 110 on the XY plane during the movement of the slide door 50 is adjusted.

While the slide door 50 is moved in the opening direction D111, the arm of the wire harness 110 at the slide door 50 in the U-shape is extended, and the arm thereof at the vehicle body 60 become shortened. Then, in a stage that the arm of the wire harness 110 at the vehicle body 60 is shortened to a certain extent, the one end of the wire harness at the vehicle body side is swung toward the back side of the vehicle 5 in a swing direction D15. Thereafter, in this state, the slide door 50 is moved in the opening direction D111, and then reaches a full opening state.

When the slide door 50 is closed in the closing direction D112 from the full opening state, the wire harness 110 traces the reverse movement of the above movement when the above slide door 50 is opened. Firstly, in its initial stage, the one end of the wire harness 110 at the vehicle body side is swung in the reverse direction of the above swing direction D15, and thereby the wire harness 110 has a U-shape on the XY plane. Thereafter, in a stage that the slide door 50 continues to move in the closing direction D112 and the arm at the slide door side in the U-shape is shortened to a certain extent, the one end of the wire harness 110 at the slide door side swings as below. That is, in this stage, the one end of the wire harness 110 at the slide door side swings toward the back side of the vehicle 5 being a reverse side of the energizing direction D12 against the energizing force in door side holding portion 140. Thereafter, the slide door 50 is moved in the closing direction D112 in this stage, and the wire harness 110 is extended linearly and reaches a full closing state.

Herein, an end portion in a floor of the vehicle body 60 at the slide door 50 side is a step 61 formed to be lower by one step and where a person place his or her foot when riding a vehicle. When opening and closing the slide door 50, the arm of the wire harness 110 having the U-shape at the vehicle body side passes near the step 61 on the XY plane.

At this time, generally, in a field of the power supply device attached to the slide door of the vehicle, there is a desire to suppress a bulge toward the vehicle body side when the wire harness is curved during opening and closing of the slide door. Therefore, in the embodiment of the preset invention, in order to restrict the curvature in which the wire harness 110 is inflated toward the vehicle body side, the curvature regulating member 130 is provided to be located along the wire harness 110. The curvature regulating member 130 limits the curvature of the wire harness 110 on the XY plane. Further, the curvature regulating member 130 allows the curvature such that one side in the allowable direction D13 (back side of the vehicle 5 in the embodiment of the present invention) becomes an inner side. Meanwhile, regarding the curvature like that the other side in the allowable direction D13 becomes an inner side (front side of the vehicle 5 in the embodiment of the preset invention), the curvature regulating member 130 limits the curvature more than a predetermined limit state.

Figure 2:
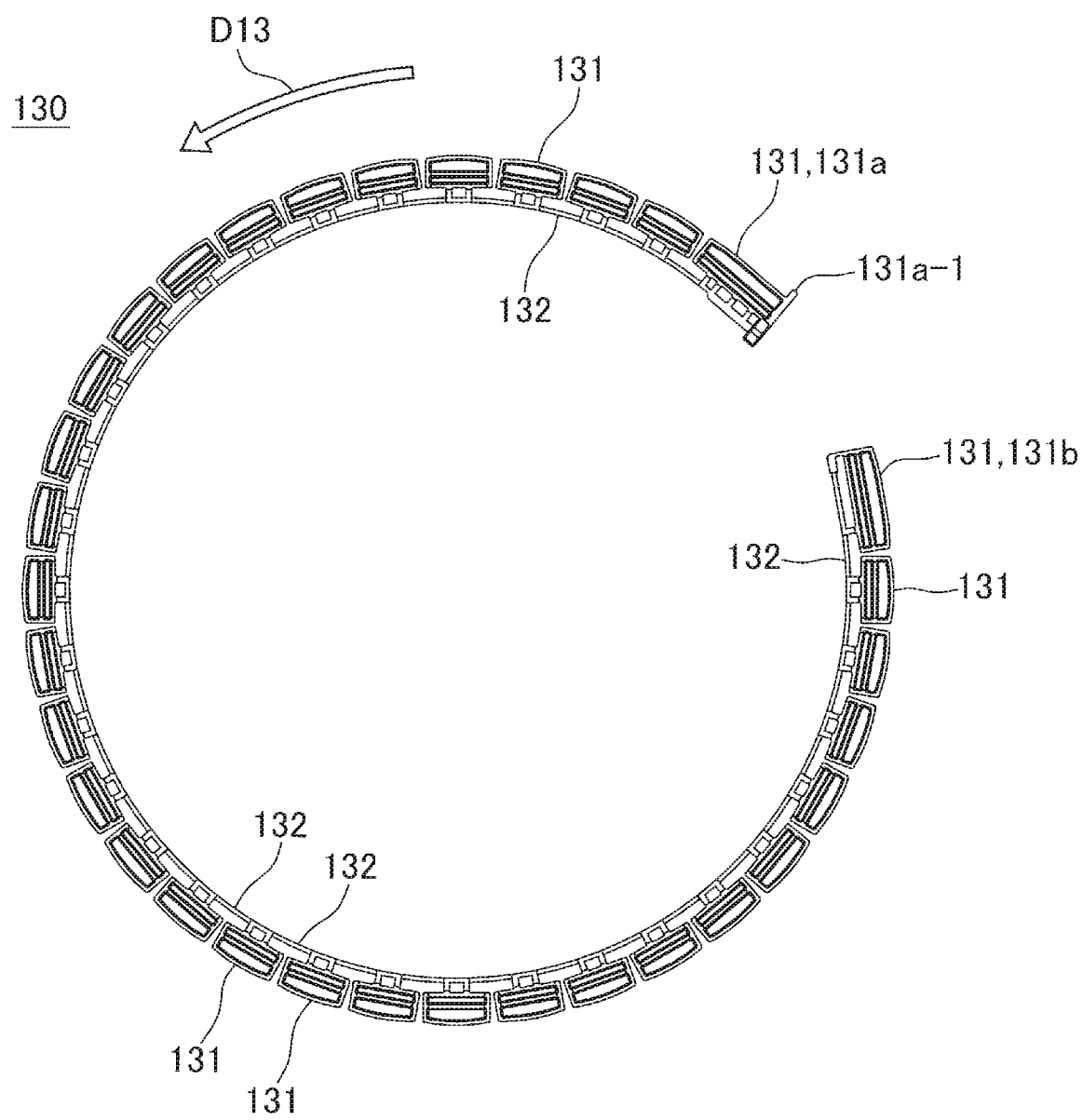
FIG. 2 is a view showing the curvature regulating member shown in FIG. 1.
Figure 3:
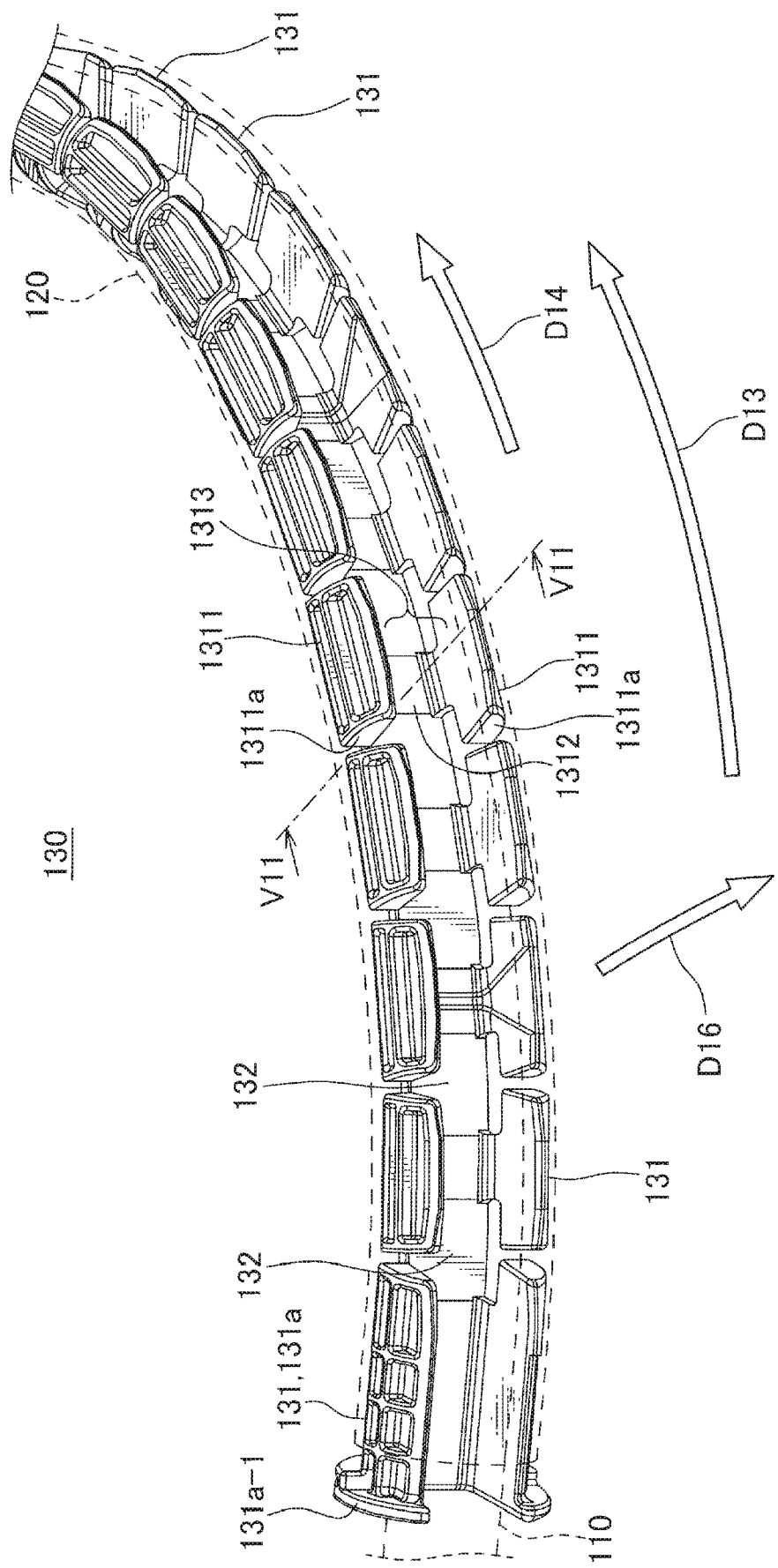
FIG. 3 is a perspective view showing a structure of the curvature regulating member in detail in a part at a vehicle side in the curvature regulating member shown in FIG. 2 as one representative example.

FIG. 2 is a view showing the curvature regulating member shown in FIG. 1. FIG. 3 is a perspective view showing a structure of a part of the curvature regulating member at the vehicle body side as one example. Further, FIG. 4 is a cross-sectional view taken along the line V11-V11 in FIG. 3.

The curvature regulating member 130 is located between an inner surface of the corrugated tube 120 and the wire harness 110 such that the wire harness 110 is surrounded in a circumferential direction and the curvature is guided along the wire harness 110. The curvature regulating member 130 has substantially the same length as the corrugated tube 120. In FIG. 2, the curvature regulating member 130 curved in a circular shape is shown. In FIG. 2, an end portion of the upper side is the vehicle body 60 side, and an end portion of the lower side is the slide door 50 side.

The curvature regulating member 130 has a plurality of member pieces 131 arranged along the wire harness, and flexible connections 132 coupling adjacent member pieces in the plurality of member pieces 131. In the embodiment of the present invention, the plurality of member pieces 131 and the connections 132 are integrally formed with resin. In FIG. 3, a part of the curvature regulating member 130 at the vehicle body 60 side which is bent and curved in the allowable direction D13 on the XY plane shown in FIG. 1 is illustrated. The connection 132 is a flexible member arranged along the wire harness 110 such that it is located in the inner side of the curved shape when the wire harness 110 is curved like that.

As one example is shown in FIG. 3, each of the plurality of member pieces 131 has a pair of opposed walls 1311 opposed to each other such that the wire harness 110 is sandwiched between the opposed walls 13111, and a joint wall 1312 joining the pair of opposed walls 1311 to each other. The cross sectional shape of each of the member pieces 131 intersecting with the wire harness 110 in the longitudinal direction D14 is formed with a substantially C-shaped by three walls of the opposed walls and the joint wall 1312 as shown in FIGS. 3 and 4.

The plurality of member pieces 131 is arranged along the wire harness 110 such that an end surface 1311*a* of the opposed wall 1311 in each of the member pieces 131 is opposed to each other. The plurality of member pieces 131 are arranged such that a joining wall 1312 joining the pair of the opposed walls 1311 is located in an inner side of the wire harness 110 in the curvature shape, that is, it is positioned in the inner side of the curvature shape when curving in the allowable direction D13 as shown in FIGS. 2 and 3. Further, the joining walls 1312 in the member pieces 131 adjacent to each other are coupled by the connection 132.

In each member piece 131, a space partitioned with the pair of opposed walls 1311 and the joining wall 1312 becomes a receiving groove 1313 opening toward an outer side of the curvature shape and receiving the wire harness in an inner side thereof.

As shown in FIGS. 3 and 4, the connection 132 is a plate member, and formed to be thin with thickness capable of bending both in the allowable direction D13 and a direction opposed to the allowable direction D13. Furthermore, the curvature regulating member 130 is located such that the plate-shaped connection 132 is perpendicular to the XY plane. Thereby, the curvature of the curvature regulating member 130 is limited onto the XY plane, and as a result the curvature of the wire harness 110 is also limited onto the XY plane.

Further, the member piece 131a positioned in an end portion of the curvature regulating member 130 at the vehicle body 60 side is held in the vehicle body side holding portion 150 shown in FIG. 1 together with an end portion of the corrugated tube 120. On the other hand, the member piece 131b positioned in an end portion at an opposite side in the curvature regulating member 130, that is, the end portion at the slide door 50 side is not held in the door side holding portion 140. Thereby, the member piece 131b can be contacted and separated to the door side holding portion 14 according to the curvature of the curvature regulating member 130. In the member piece 131a at the vehicle body 60 side, a flange 131a-1 is provided so as to hold the member piece 131a in the vehicle body side holding portion 150.

The curvature regulating member 130 is limited to the curvature on the XY plane shown in FIG. 1, and is able to be curved in the allowable direction D13 on the XY plane. Further, the curvature regulating member 130 cannot be curved in a regulating direction D16 toward an inner side of the vehicle body 60 on an opposite side to the allowable direction D13 more than a limit state described below.

As shown in FIG. 3, the curvature regulating member 130 is able to be curved in the allowable direction D13 since the adjacent member pieces 131 among the plurality of member pieces 131 in the curved position are separated at the opposite side to the connection 132 and the connection 132 is bent. Thereby, the curve of the wire harness 110 can be allowed to be bent in the allowable direction D13.

On the other hand, in the regulating direction D16, the curvature regulating member 130 is not able to be curved beyond the limit state since the adjacent member pieces 131 among the plurality of member pieces 131 in the curved position abut on each other at the opposite side to the connection 132 side. A state that the adjacent member pieces 131 are abutted in the curved position is the limit state curved in the regulating direction D16. The curvature regulating member 130 cannot be curved in the regulating direction D16 beyond the limit state. Thereby, the curve in the wire harness 110 bent in the regulating direction D16 over the limit state in the curvature regulating member 130 is regulated.

According to the embodiment of the preset invention, the curvature regulating member 130 over the entire length thereof including its middle in an arrangement direction of the plurality of member pieces 13 (that is, a length direction of the wire harness 110) except a part near the vehicle body side holding portion 15 is constructed as below. In other words, when the curvature regulating member 130 is arranged linearly over the entire length thereof, each of the adjacent member pieces 131 is constructed so as to abut at the opposite side to the connection 132 side to each other. That is, in the embodiment of the present invention, the limit state in the regulating direction D16 is set to a substantially straight line state in a portion excluding a part near the vehicle body side holding portion 150. Thereby, in the wire harness 110, a substantially liner shape is maintained except a portion curved in the allowable direction D13.

Herein, as shown in FIG. 1, in the embodiment of the preset invention, a swing range in the end portion of the wire harness 110 in the vehicle body side holding portion 150 on the XY plane is as follows. That is, the swing range becomes a range that the end portion of the wire harness 110 stops before the wire harness 110 is positioned parallel to the opening and closing direction D11 of the slide door 50. For this reason, in the embodiment of the present invention, the curvature regulating member 130 is constructed so that a part near the vehicle body side holding portion 150 can be curved to some extent in the regulating direction D16 by slightly loosening a restriction on the curve in the regulating direction D16. Therefore, the part near the vehicle body side holding portion 150 of the wire harness 110 can be slightly bent in the regulating direction D16, and a portion that the liner shape is kept can be directed parallel to the opening and closing direction D11 of the slide door 50.

The above limit state in the curvature of the curvature regulating member 130 in the regulating direction D16 is adjusted by an interval between the member pieces 131. In other words, the limit state is set to a substantially straight line state by making the interval between the member pieces 131 to a substantially Zero in a case that the curvature regulating member 130 is a substantially straight line state. Furthermore, when the curvature regulating member 130 has been a substantially straight line state, the curvature regulating member 130 can be curved in the regulating direction D16 to the limit state that the adjacent member pieces 131 abut over the substantially straight line state, and thereby the restriction is loosened.

In the embodiment of the preset invention, such curvature regulating member 130 is metal-molded with a resin material.

Figure 5:
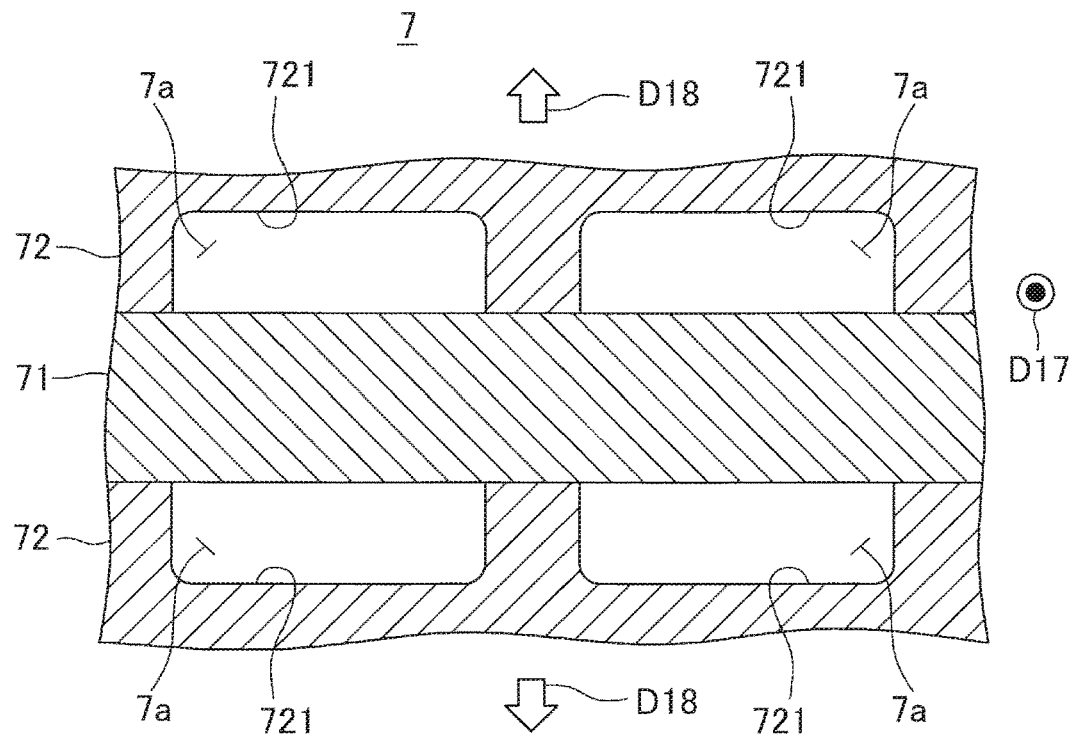
FIG. 5 is a schematic view showing a mold for forming the curvature regulating member shown in FIGS. 1 to 4.

FIG. 5 is a schematic diagram showing a mold for forming the curvature regulating member shown in FIGS. 1 to 4.

The mold 7 includes an inner mold 71, and a pair of outer molds 72 arranged so as to sandwich the inner mold 71 between them. The inner mold 71 has an outer shape corresponding to the receiving groove 131 in the above member piece 131. In the outer mold 72, a plurality of recessed portions 721 having an inner surface shape corresponding to the outer shape of the member piece 131 is formed. By combining the outer mold 72 with the inner mold 71, a filling space 7a for filling a resin material corresponding to the member piece 131 is partitioned. After the resin material is filled into the filling space 7a and hardened, the curvature regulating member 130 is formed by removing the mold 7. The inner mold 71 pulls out in an extracting direction D17 perpendicular to a plane of paper in FIG. 5, and the pair of outer molds 72 are removed in a removing direction D18 away from the inner mold 71.

Herein, in the embodiment of the present invention, the outer shape of the inner mold 71 and the recessed portion 721 of the outer mold 72 are formed such that the curvature regulating member 130 is formed with a circular shape shown in FIG. 2. At this time, the extracting direction D17 of the inner mold 71 is a radial direction of the circular shape. In order to enable such pulling out, a plurality of the inner molds 71 is arranged in a circumferential direction such that each of the inner molds 71 corresponds to a part of the curvature regulating member 130, and each of the inner molds 71 pulls out individually.

Figure 6:
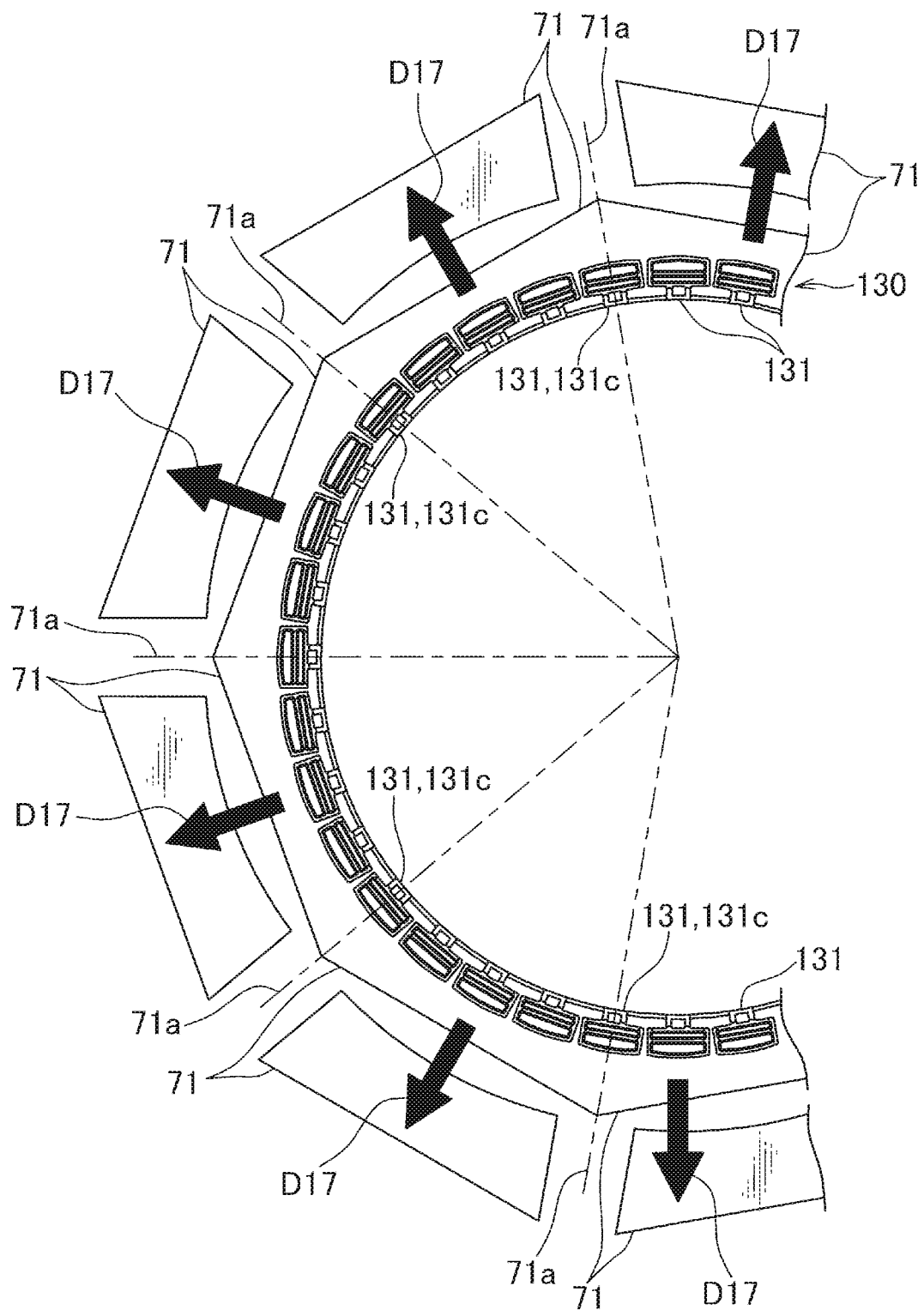
FIG. 6 is a schematic view showing a condition that a plurality of inner molds shown in FIG. 5 are arranged and extracted individually.

FIG. 6 is a schematic diagram showing a condition that a plurality of inner molds shown in FIG. 5 are arranged and extracted individually.

As shown in FIG. 6, the plurality of the inner molds 71 are arranged in a circumferential direction of the curvature regulating member 130 having the circular shape, and pull out in the extracting direction D17 individually. Further, the plurality of the inner molds 71 are separated a parting line 71a becoming a boundary of each other. As a result, in the completed curvature regulating member 130, a burr as a strip projection of the trace may occur in a position corresponding to each of the parting line 71a. The burr occurs on the inner surface of the receiving groove 1313 in the border member piece 131c corresponding to the parting line 71a as a boundary of the plurality of the inner molds 71 among the plurality of the member pieces 131. In the embodiment of the present invention, the inner surface of the receiving groove 131 in the border member piece 131c is formed as follows by assuming the occurrence of the burrs.

Figure 7:
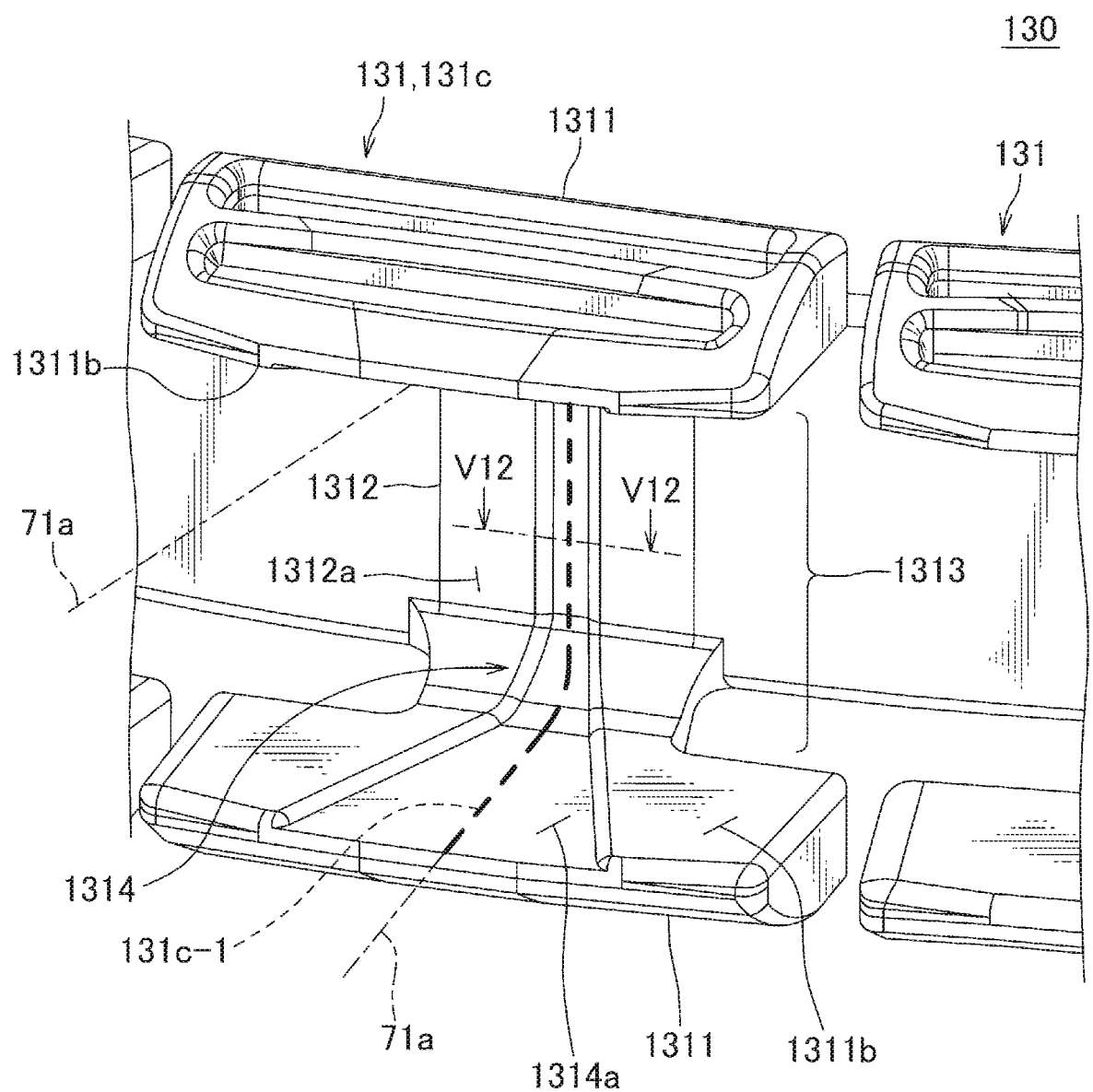
FIG. 7 is a perspective view showing an inner surface of a receiving groove in a border member piece shown in FIG. 6.
Figure 8:
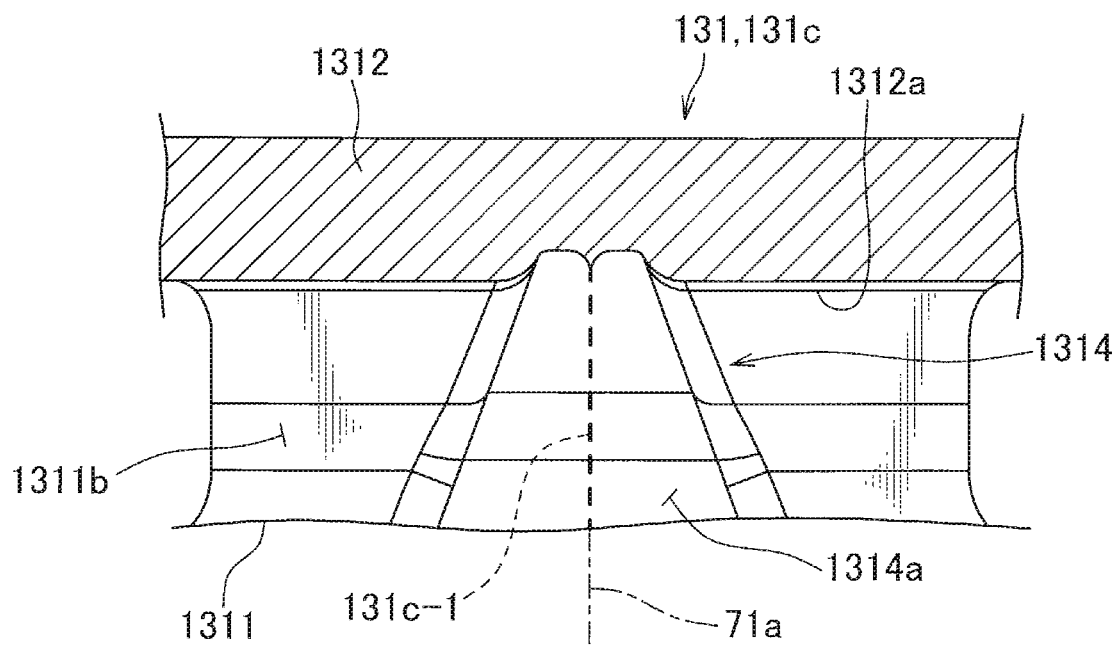
FIG. 8 is a cross-sectional view taken along the line V12-V12 in FIG. 7.

FIG. 7 is a perspective diagram showing the inner surface of the receiving groove in a border member piece shown in FIG. 6. FIG. 8 is a cross-sectional view taken along the line V12-V12 in FIG. 7.

As shown in FIGS. 7 and 8, in the inner surface of the receiving groove 1313 in the border member piece 131c, a recessed portion 1314 is provided in an area where the occurrence of the burr 131c-1 is assumed and including the parting line 71a, that is, an area including the burr 131c-1. The recessed portion 1314 is formed continuously over a pair of opposed surfaces 1311b which face to each other in the pair of opposed walls 1311 and a connection surface 1312a continuing on the opposed surface in the joining wall 1312.

Further, as shown in FIG. 8, the recessed portion 1314 is formed with a depth that the burr 131c-1 is accommodated when the burr 131c-1 is formed along the parting line 71a. Further, as shown in FIG. 7, a recessed part 1314a formed in the pair of the opposed surfaces 1311b among a series of the recessed portions 1314 has a tapered shape toward the joining wall 1312 in a planar view for each of the pair of opposed surfaces 1311b.

Figure 9:
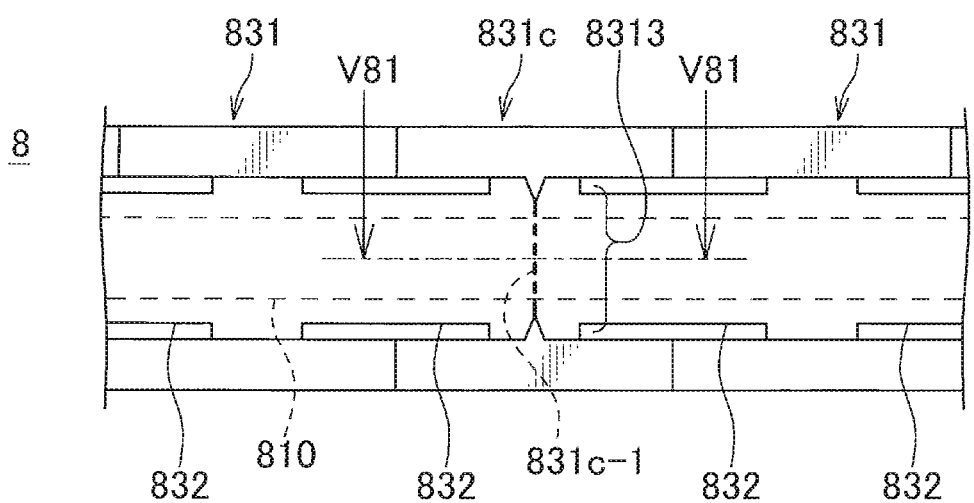
FIG. 9 is a view showing a comparison example compared with the curvature regulating member shown in FIGS. 1 to 7.
Figure 10:
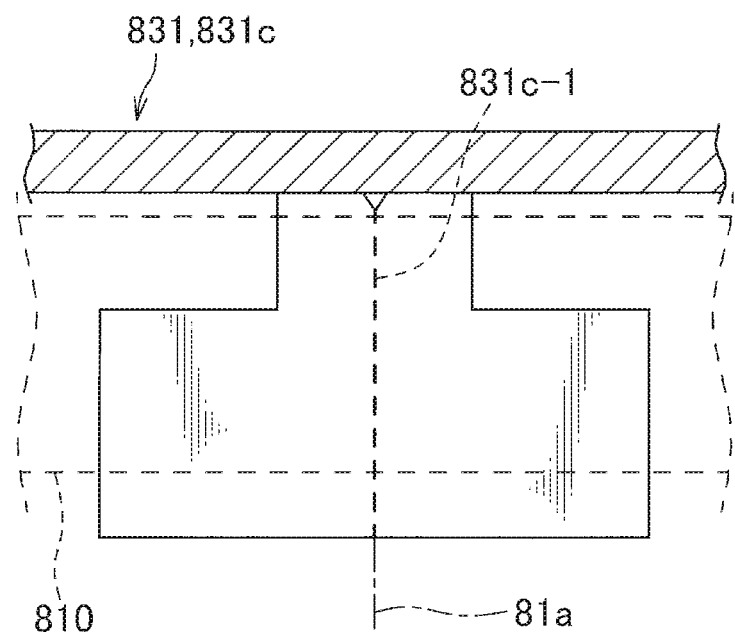
FIG. 10 is a cross-sectional view taken along the V81-V81 in FIG. 9.

FIG. 9 is a drawing showing a comparison example compared with the curvature regulating member shown in FIGS. 1 to 7. FIG. 10 is a cross-sectional view taken along the V81-V81 in FIG. 9.

The curvature regulating member 8 of the comparison example is also constructed by coupling a plurality of member pieces 831 having the receiving groove 8313 of the wire harness 810 with the connection 832. However, the curvature regulating member 8 of the comparison example differs from the curvature regulating member 130 shown in FIG. 7 in that the recessed portion of the area including the above parting line is not provided. For this reason, the curvature regulating member 8 of the comparison example may interfere with the wire harness 810 when the burr 831c-1 due to metal-molding occurs on the border member piece 831c corresponding to the parting line 81a among the plurality of member pieces 831.

On the other hand, in the curvature regulating member 130 of the embodiment of the present invention, degree of interference between the burr 131c-1 due to metal molding and the wire harness 110 can be suppressed as mentioned.

Figure 11:
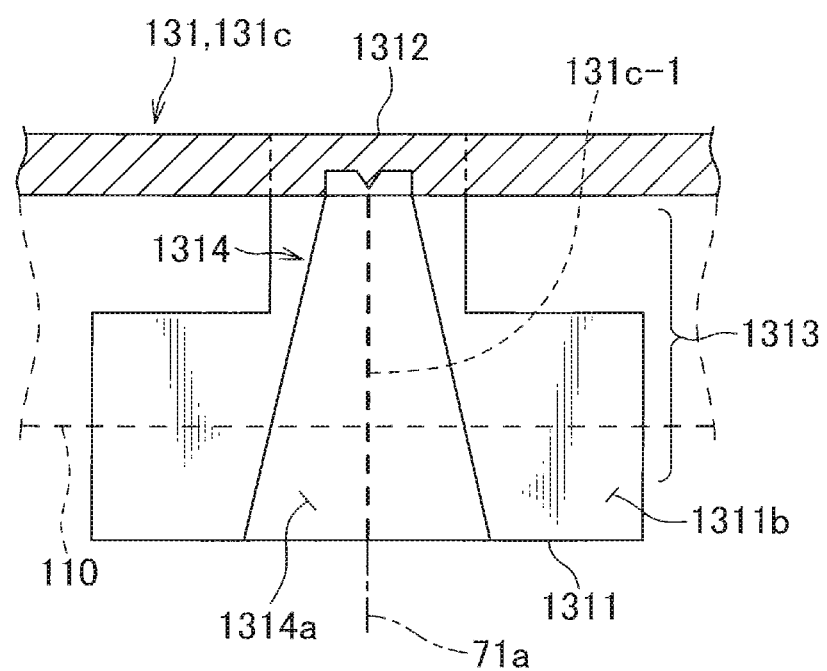
FIG. 11 is a view showing a condition that degree of interference between burr due to metal-molding and the wire harness is suppressed.

FIG. 11 is a view showing a condition that degree of interference between the burr due to metal-molding and the wire harness is suppressed in the curvature regulating member shown in FIGS. 1 to 8.

According to the embodiment of the preset invention, in the inner surface of the receiving groove 1313 in the border member piece 131c corresponding to the parting line 71a, the recessed portion 1314 is provided in the area including the burr 131c-1. Thereby, the burr 131c-1 stands up from a bottom of the recessed portion 1314, and thereby the interference with the wire harness 110 accommodated in the receiving groove 1313 is suppressed by the depth of the recessed portion 1314. According to the curvature regulating member 130 of the embodiment of the present invention such that, the degree of the interference between the burr 131c-1 due to metal-molding and the wire harness 110 can be suppressed.

Also, according to the power supply device 1 of the embodiment of the present invention shown in FIG. 1, the curvature regulating member 130 of the embodiment of the present invention described above is applied to the power supply device 1. Therefore, the degree of the interference between the burr 131c-1 due to metal-molding and the wire harness 110 can be controlled.

Herein, in the curvature regulating member 130 of the embodiment in the preset invention, as shown in FIGS. 8 and 11, the recessed portion 1314 is formed with a depth in which the burr 131c-1 is received when the burr 131c-1 is formed along the parting line 71a. Thereby, interference between the wire harness 110 and the burr 131c-1 can be avoided.

Further, in the curvature regulating member 130 of the embodiment in the present invention, the recessed part 1314a formed in the pair of the opposed surfaces 1311b opposite to each other in the pair of opposed walls 1311 has the tapered shape toward the joining wall 1312. For this reason, the inner mold 71 shown in FIGS. 5 and 6 pull out in the extracting direction D17 in which the projection portion of an outer shape corresponding to the recessed part 1314a separates from a tip of the above tapered shape. Thereby, mold release resistance when pulling out the inner mold is suppressed. Therefore, workability in manufacturing can be improved.

The above embodiments are shown as representative embodiments, and the present invention is not limited thereto. That is, those skilled in the art are capable of making various modifications according to conventional known knowledge without departing from the scope of the present invention. The modifications are included in the category of the present invention insofar as the configuration of the vehicle electrical system according to the present invention is enabled in the modifications.

For example, in the above embodiment of the preset invention, the slide door 50 is illustrated as one example of the slide member in the preset invention. However, the slide member in the present invention is not limited thereto. For example, the slide member may be a slide sheet if it is slidably moved for the vehicle body.

Further, in the above embodiment of the preset invention, the curvature regulating member 130 positioned between the inner surface of the corrugated tube 120 and the wire harness 110 is illustrated as one example of the curvature regulating member in the present invention. However, the curvature regulating member in the present invention is not limited thereto. For example, the curvature regulating member of the present invention may be an object attached to the wire harness by a tape or a cable band as long as it may be an object arranged along the wire harness.

Further, in the above embodiment of the preset invention, as shown in FIG. 2, the curvature regulating member 130 metal-molded with the circular shape is illustrated as one example of the curvature regulating member in the present invention. However, the curvature regulating member in the present invention is not limited thereto. As long as the curvature regulating member in the present invention is metal molded by using a plurality of inner molds in which the parting line occurs in the metal molding, specific shapes such as S-shaped to be formed are not limited.

Further, in the above embodiment of the preset invention, as shown in FIG. 7, the member piece 131 including the opposed wall 1311 having a T-shaped in planar view and the joining wall 1312 joining a narrow portion corresponding to the T-shaped vertical bar is illustrated as one example of the member piece in the preset invention. However, the member piece is not limited thereto. As long as the member piece in the preset invention is arranged along the wire harness, and has the receiving groove for accommodating the wire harness in the inner side thereof, specific shape of each of parts is not limited.

Further, according to the above embodiment, the burr 131c-1 due to metal-molding is described as one example of the strip projection in the present invention. However, the strip projection of the present invention is not limited thereto. For example, the projection may be an object intentionally provided due to strength improvement and design requirement.

Further, according to the above embodiment, as shown in FIG. 6, the inner mold 71 having a substantially trapezoidal block shape in which one side is curved in a circular shape in a plane view is illustrated as one example of the inner mold in the present invention. However, the inner mold of the present invention is not limited thereto. As long as the inner mold in the present invention has an outer shape corresponding to the receiving groove of the curvature regulating member of a formation target, its specific shape is not limited.

REFERENCE SIGNS LIST 1 power supply device
5 vehicle
6 mold
7a filling space
50 slide door (slide member)
60 vehicle body
71 inner mold
71a parting line
72 outer mold
110 wire harness
120 corrugated tube
130 curvature regulating member
131 member piece
131c border member piece
131c-1 burr (projection)
132 connection
1311 opposed wall
1311b opposed surface
1312 joining wall
1312a continuous surface
1313 receiving groove
1314 recessed portion
1314a recessed part

The invention claimed is:
1. A curvature regulating member comprising:
a plurality of member pieces arranged along a wire harness and each having a receiving groove for accommodating the wire harness; and
a flexible connection coupling the member pieces adjacent to each other,
wherein the curvature regulating member regulates a curvature of the wire harness on a predetermined plane by contact with the adjacent member pieces, and
wherein a strip projection is provided in an inner surface of the receiving groove in at least one of the plurality of the member pieces, and a recessed portion is provided in an area including the strip projection in the inner surface, and
wherein the strip projection and the recessed portion are provided to a portion of the inner surface of the receiving groove at which the flexible connection is not provided.

2. The curvature regulating member according to claim 1, wherein the recessed portion is formed with a depth in which the strip projection is received.

3. The curvature regulating member according to claim 2, wherein each of the plurality of the member pieces has a pair of opposed walls opposed to each other so as to sandwich the wire harness between the opposed walls and a joining wall connecting one side to another side of the pair of the opposed walls,
wherein the recessed portion is formed by a pair of opposed surfaces opposed to each other in the pair of the opposed walls and a continuous surface continuing the opposed surfaces in the joining wall, and
wherein a recessed part formed in the pair of the opposed surfaces in the recessed portion has a tapered shape toward the joining wall in a plane view with respect to each of the pair of the opposed surfaces.

4. A power supply device provided in a vehicle having a vehicle body and a slide member and electrically connecting the vehicle body and the slide member, comprising:
a wire harness arranged between the vehicle body and the slide member; and
the curvature regulating member arranged along the wire harness and described in claim 3.

5. A power supply device provided in a vehicle having a vehicle body and a slide member and electrically connecting the vehicle body and the slide member, comprising:
a wire harness arranged between the vehicle body and the slide member; and
the curvature regulating member arranged along the wire harness and described in claim 2.

6. The curvature regulating member according to claim 1, wherein each of the plurality of the member pieces has a pair of opposed walls opposed to each other so as to sandwich the wire harness between the opposed walls and a joining wall connecting one side to another side of the pair of the opposed walls,
wherein the recessed portion is formed by a pair of opposed surfaces opposed to each other in the pair of the opposed walls and a continuous surface continuing the opposed surfaces in the joining wall, and
wherein a recessed part formed in the pair of the opposed surfaces in the recessed portion has a tapered shape toward the joining wall in a plane view with respect to each of the pair of the opposed surfaces.

7. A power supply device provided in a vehicle having a vehicle body and a slide member and electrically connecting the vehicle body and the slide member, comprising:
a wire harness arranged between the vehicle body and the slide member; and
the curvature regulating member arranged along the wire harness and described in claim 6.

8. A power supply device provided in a vehicle having a vehicle body and a slide member and electrically connecting the vehicle body and the slide member, comprising:
  a wire harness arranged between the vehicle body and the slide member; and
  the curvature regulating member arranged along the wire harness and described in claim 1.

* * * * *